United States Patent [19]
Hewson

[11] Patent Number: 6,035,724
[45] Date of Patent: Mar. 14, 2000

[54] DIFFERENTIAL PRESSURE INSTRUMENT SUPPORT MANIFOLD HAVING ROTARY MODE SELECTION SYSTEM

[76] Inventor: John E. Hewson, 12430 Piping Rock La., Houston, Tex. 77027

[21] Appl. No.: 09/241,821

[22] Filed: Feb. 1, 1999

Related U.S. Application Data

[60] Provisional application No. 60/073,324, Feb. 2, 1998.

[51] Int. Cl.[7] .................................................. G01L 7/00
[52] U.S. Cl. ........................................................ 73/756
[58] Field of Search ........................ 73/714, 756, 118.1; 29/890.142; 137/3, 269, 270, 597, 625.19

[56] References Cited

U.S. PATENT DOCUMENTS

| | | | |
|---|---|---|---|
| 4,030,352 | 6/1977 | Smith et al. | 73/118.1 |
| 4,602,657 | 7/1986 | Anderson | 137/595 |
| 4,672,728 | 6/1987 | Nimberger | 29/890.142 |
| 4,680,957 | 7/1987 | Dodd | 137/3 |
| 5,036,884 | 8/1991 | Miller et al. | 137/597 |

*Primary Examiner*—William Oen
*Attorney, Agent, or Firm*—James L. Jackson; Mayor, Day, Caldwell & Keeton, L.L.P

[57] ABSTRACT

A spool type differential pressure transmitter support and valving manifold having a manifold body defining a process face and a transmitter face and having a generally cylindrical internal surface defining an open ended spool chamber and having signal inlet and outlet passages intersecting the process and transmitter faces and being in communication with the spool chamber. The manifold body also defines a vent passage which is in communication with said spool chamber. A spool member is positioned for rotation to "run", "zero" and "off" positions within the spool chamber, has ends extending from the open ends of the spool chamber and has a pair of transversely oriented body passages positioned for selective registry with the signal inlet and outlet passages at the "run" position of the spool member. Circumferential seals each preferably comprising an O-ring and a back-up ring establish sealing between the spool member and the manifold body and serve to isolate the signal passages from one another and to prevent leakage of signal pressure at the open ends of the spool chamber. A plurality of mode seal elements are carried by the outer periphery of the spool member and provide for manifold mode selection to the "run", "zero" and "off" positions responsive to rotational positioning of said spool member relative to said manifold body to permit calibration of the differential pressure transmitter with the pressurized process in operation.

26 Claims, 5 Drawing Sheets

DIFFERENTIAL PRESSURE INSTRUMENT SUPPORT MANIFOLD HAVING ROTARY MODE SELECTION SYSTEM

The benefit of U.S. Provisional Application Serial No. 60/073,324 filed on Feb. 2, 1998 by John E. Hewson and entitled SPOOL TYPE INSTRUMENT MANIFOLD is hereby claimed and is incorporated herein by reference for all purposes.

BACKGROUND OF THE INVENTION

1. Field of the Invention

This invention relates to the valving means for instrument installations when flow measurement and/or control is desired in a fluid flow line using the differential pressure method for determining the flow rate. More particularly, the present invention concerns a rotary spool type instrument mounting and mode selecting manifold having a five-valve-function being "RUN", "ZERO—Lockup", "OFF—Lockup", "VENT" and "PURGE" and permitting simple and efficient calibration of a differential pressure transmitter instrument that is mounted thereto. Even more specifically, the present invention concerns a mounting and mode selection manifold providing instrument personnel with the capability of achieving "run", "zero" and "off/calibrate" functional modes simply by rotational settings of a rotary spool member of the manifold.

2. Description of the Prior Art

The differential pressure method of flow determination of such fluids as liquids, natural gas or other gases, and the like, is widely accepted in industry as an accurate means of flow rate determination. Differential pressure transmitters to sense and transmit the pressure differential from the pressure taps of the primary element (orifice plate, flow nozzle, venturi and the like), are well known in the art and are prized for their fast speed of measurement response particularly with all-electric instrument systems. These differential pressure transmitters are normally remotely located from the computer or meter location which processes the differential signal into a flow rate or flow volume over time.

The fluid flowing in a flow line or "process" is in pressure communication with the differential pressure transmitter through conduits from the pressure taps in the primary element to the transmitter.

To routinely check the transmitter for accuracy, a means to equalize the high and low pressure signals at the transmitter must be provided to show that zero pressure differential (no flow) results in a zero signal output from the transmitter. Checking zero results from blocking one or both of the signal lines from the primary element to the transmitter and opening an equalizing line in the manifold causing a zero pressure differential at the transmitter.

The present state-of-the-art instrument transmitter manifold used for natural gas measurement contains five (5) valves which must be manually manipulated to obtain the desired zeroing results. This manual manipulation procedure is time consuming and costly for the operator who must operate these valves in a specific sequence to obtain the zero condition and then return the manifold to the operating service in the specific reverse sequence. If the zero and return sequences are not precisely followed, the sensitive differential pressure transmitter can be damaged.

For the measurement of high volumes of expensive natural gas, it is mandatory that the most accurate differential pressure measurement be made and the system design be such that all potential errors be eliminated or minimized.

It has been well established by both field measurement research and field documentation that improved measurement accuracy results if the conduit from the primary element (orifice plate, etc.) to the transmitter has the same diameter as that of the primary element (⅜" for orifice flange unions through 12" diameter) and has no expansion/contraction points in the differential pressure conduits such as presently experienced with rising stem plug or gate valve seat cavities. Improved measurement accuracy also results when the transmitter is connected in close coupled relation with the primary element.

In the "run" position, if the high differential pressure passage used to check zero were to leak from the high differential side to the low differential side, the resulting flow measurement would create an error and a loss of revenue for the seller. To prevent this possibility, the equalizer passage of current 5-valve manifolds have two closed needle valves with an open bleed-to-atmosphere valve (normally open) between the two closed needle valves. If either needle block valve leaks, the leaked fluid will be vented to atmosphere through the open bleed valve and not affect the measurement. The manifold of the present invention retains this measurement safety feature but eliminates the needle valves with "O-ring valves" which need not ever be manipulated. If the O-rings were to leak, the leaked fluid will vent to atmosphere in the same manner and will not affect measurement accuracy.

Differential pressure transmitters are subject to "zero shift" (a measurement error if not corrected) when uncontrolled pressure waves in the pipeline travel from upstream to downstream. The intensity of these pressure waves is much larger than the fluid differential pressure being measured and reach the orifice plate (or other differential primary device) on the high side first. So long as the pressure wave is less than preestablished during transmitter calibration, there will be no zero shift. However, when the installation is first commissioned, (that is, atmospheric pressure is in the transmitter chambers) present manifold design dictates that the equalizer line be open and the transmitter be pressurized by opening the high side (up stream side) valve first. The rotary spool type manifold represented by this invention has a built-in feature that allows the high side to be pressurized before the low side is pressurized establishing that zero shift from pressure overage is eliminated or minimized.

Many companies check the zero and span calibration of the transmitter at the measurement location and recalibrate in-place if required. Recalibration requires the use of sensitive, easily damaged special differential pressure calibration equipment. To protect the calibration equipment using presently marketed manifolds, the field technician must be certain through his valve manipulation procedure, that full line pressure from the process does not reach the sensitive calibration equipment, thus averting its damage. The manifold of this invention has a built-in safety feature requiring no valve(s) manipulation and protects the transmitter from being subjected to the process pressure while calibration is in progress. This safety feature further blocks the process pressure if the transmitter is removed from the assembly thereby eliminating discharge of process fluid to the atmosphere and potentially harming the technician and/or the environment. This safety feature may be released only by conscious manual effort to place the manifold in the active measurement mode ("RUN" position).

As natural gas usage increases, so do the pipe sizes increase that transport the gas. Therefore the diameter of the orifice plate increases to accommodate the larger pipe sizes.

In line sizes 6" diameter or greater, the impingement of the high velocity gas on the orifice plate bows the standard 1/8" thick plate causing an error in measurement. This problem is solved by increasing the orifice plate thickness from 1/8" to 1/4". Since it is troublesome and expensive for the field technician to have two orifice plate thicknesses depending on the line size, many companies use 1/4" thick orifice plates for all line sizes.

When using 1/8" thick orifice plates, the center-line spacing between orifice flange union signal taps is 2.125". When using 1/4" thick orifice plates, this dimension increases by 1/8" to 2.250. This means that there is a 1/16" offset between the 3/8" signal passage diameter of the supporting flange-to-manifold adaptor (commonly called "the FUTBOL") and the manifold inlet port on each the high and low pressure signal passages. Since it is desirable to provide a manifold having a uniform 3/8" diameter signal path from the orifice flange union through the manifold and into the transmitter, this 1/16" offset creates a point reduction of 3/8" to 5/16", thus violating the design requirement of 3/8" signal passages with no interruptions which may lower the accuracy of measurement. It is desirable therefore, to provide a rotary spool type mode selection manifold which provides a uniform 3/8" diameter signal path from the orifice flange union through the manifold and into the transmitter that is mounted to the manifold body and which accommodates the 1/16" offset that exists when 1/4" orifice plates are used.

SUMMARY OF THE INVENTION

It is a principal feature of the present invention to provide a novel rotary spool type instrument manifold having conventional five-valve functioning capability.

It is a feature of the present invention to provide a novel rotary spool type instrument manifold which improves the measurement signal accuracy of the differential pressure sensing instrument by eliminating the expansion/contraction of the pulsating signal through the manifold having large plug type valve cavities and provides for close coupling of the transmitter to the primary element of the process;

It is another feature of the present invention to provide a novel rotary spool type instrument manifold which incorporates a five-valve manifold, double-block-and-bleed feature without requiring the use of manually actuated valves;

It is also a feature of the present invention to provide a novel rotary spool type instrument manifold which employs single handle rotation of the spool member of the manifold for changing spool position from "RUN" to "ZERO" to "OFF", thereby providing much time saving for personnel in charge of instrument measurements to observe transmitter "ZERO" and eliminating any procedural error in so doing;

It is another feature of the present invention to provide a novel rotary spool type instrument manifold which incorporates a design making it possible to correctly position the manifold high pressure side-to-high pressure side regardless of flow direction;

It is a feature of the present invention to provide a novel rotary spool type instrument manifold which, when changing from "ZERO" or "OFF" to "RUN", the manifold design permits the high-side process signal to enter the transmitter before the low-side pressure is admitted, thus supporting the requirement that transmitters should always be over-ranged from the high pressure-side;

It is a feature of the present invention to provide a novel rotary spool type instrument manifold which maintains a 3/8" diameter signal passage from the point of signal entry in the orifice flange union/fitting through the manifold and all other attachments to the differential pressure instrument chambers;

It is also a feature of the present invention to provide a novel rotary spool type instrument manifold which is roddable to enable removal of hydrates and other fouling materials that may build up within the signal passages of the instrument manifold;

It is another feature of the present invention to provide a novel rotary spool type instrument manifold which, when rotating the handle to "ZERO" position, the transmitter is zeroed under full line pressure, an important feature since zero output of the transmitter will change from no-pressure to line pressure;

It is a feature of the present invention to provide a novel rotary spool type instrument manifold which enables simple and efficient removal of the transmitter simply by opening the bleed plug on the manifold when the manifold is in the "ZERO" mode to depressurize the transmitter and then unbolting and removing the transmitter from the manifold;

It is also a feature of the present invention to provide a novel rotary spool type instrument manifold which ensures balancing of internal forces within the manifold mechanism so that no force exists that might otherwise eject the spool from the manifold body chamber;

It is another feature of the present invention to provide a novel rotary spool type instrument manifold which provides for run-to-zero spool rotation in 90° or less than 90° rotation of the spool, depending on manifold design, thereby enabling actuation of the manifold mechanism by either a pneumatic or electric operator which may be used to schedule computer remote zeroing of the instrument transmitter getting the most accurate zero possible even when the transmitter is located at a remote installation;

It is a feature of the present invention to provide a novel rotary spool type instrument manifold which, for process measurements in the chemical, petroleum refining and other related process industries, the instrument manifold design permits the body to be of selected metal and the rotary spool to be composed of or plated with a selected metal or a polymer coated metal or a spool member composed entirely of polymer material;

It is a feature of the present invention to provide a novel rotary spool type instrument manifold which, because the design lends itself well to investment casting, the cost of manufacturing by investment casting can be significantly less than that of a standard five-valve manifold for similar quantities in construction materials; and It is another feature of the present invention to provide a novel rotary spool type mode selecting instrument manifold which accommodates the wider spaced high pressure and low pressure signal inputs that exist when a 1/4" orifice plate is provided in a primary element.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings

DETAILED DESCRIPTION OF PREFERRED EMBODIMENT

Figures 1, 8:
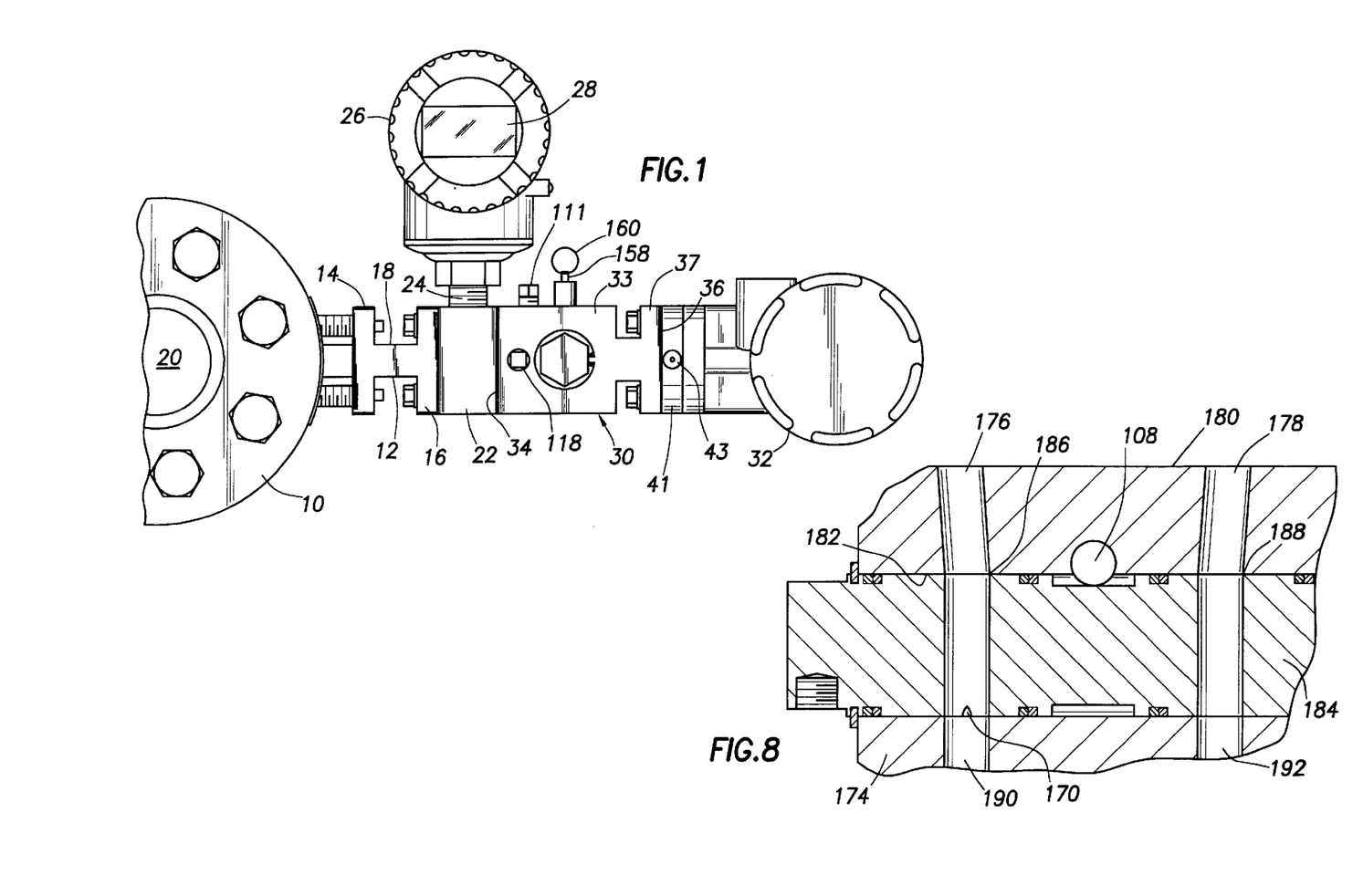
FIG. 1 is an elevational view showing a rotary spool type differential pressure instrument support manifold embodying the principles of the present invention, and being interconnected between a process and a differential pressure sensing transmitter.
FIG. 8 is a partial sectional view of an alternative embodiment of the present invention being similar to the views of FIGS. 6 and 7 and illustrating inclined signal passages in an instrument manifold body structure to provide adaptation to process connections having wider signal passage spacing when a ¼" thick orifice plate is provided to accommodate conditions of large orifice plate or high differential pressure.

Referring now to the drawings and first to FIG. 1 a "process" is shown at 10 which, as is typical, is in the form of an orifice flange union/fitting having an internal orifice plate defining a circular orifice of specific dimension. To the orifice flange union/fitting is mounted a process interface support 12 having mounting flanges 14 and 16, the mounting flanges being integral with a web 18 having a pair of internal signal passages communicated with the flow passage 20 of the orifice flange union/fitting respectively on the upstream (high pressure side) and downstream (low pressure side) sides of the orifice plate. Thus, the signal pressures within the high pressure and low pressure signal passages will differ according to the differential pressure across the orifice plate of the orifice flange union/fitting 10. If desired, a mounting member 22 may be supported by the mounting flange 16 and will be provided with signal passage connectors 24 which conduct the high or low side static signal pressures to a static pressure sensor 26, which may be an electronic static pressure sensor having a liquid crystal display 28.

According to the teachings of the present invention a rotary spool type differential pressure transmitter manifold, shown generally at 30, is interposed in the process connection and provides structural support as well as the five-valve function valving control for a differential pressure transmitter instrument 32.

Figure 2:
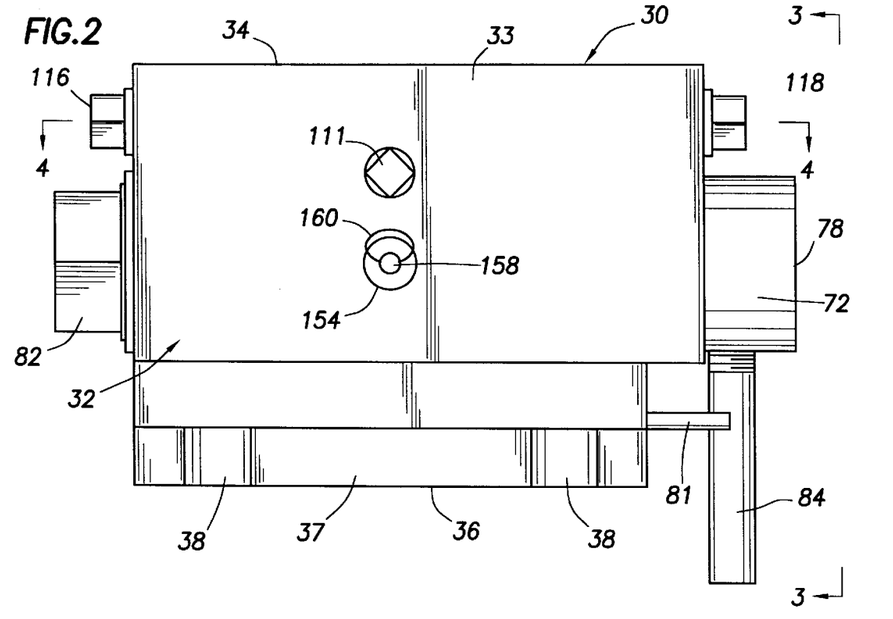
FIG. 2 is a plan view of the rotary spool type differential pressure instrument support manifold of FIG. 1.
Figure 3:
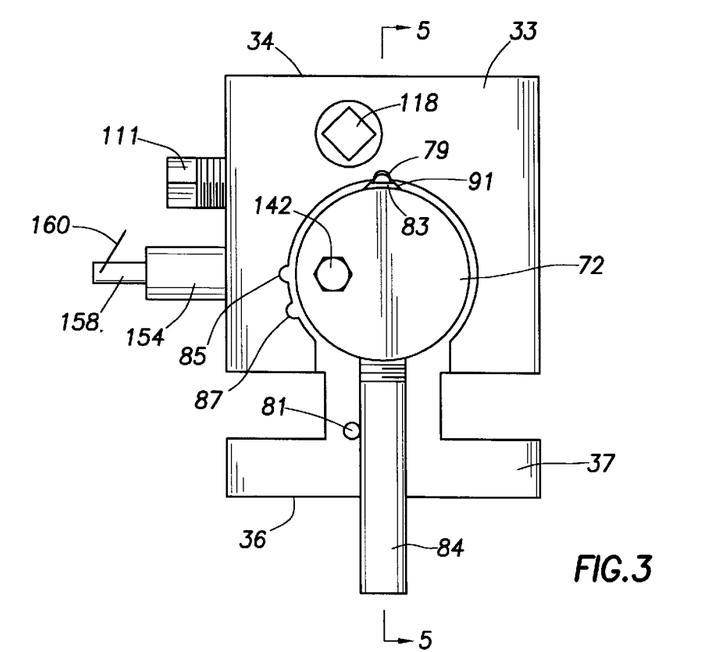
FIG. 3 is an end elevational view of the rotary spool type differential pressure instrument support manifold of FIG. 1, the view being taken along line 3—3 of FIG. 2.
Figure 4:
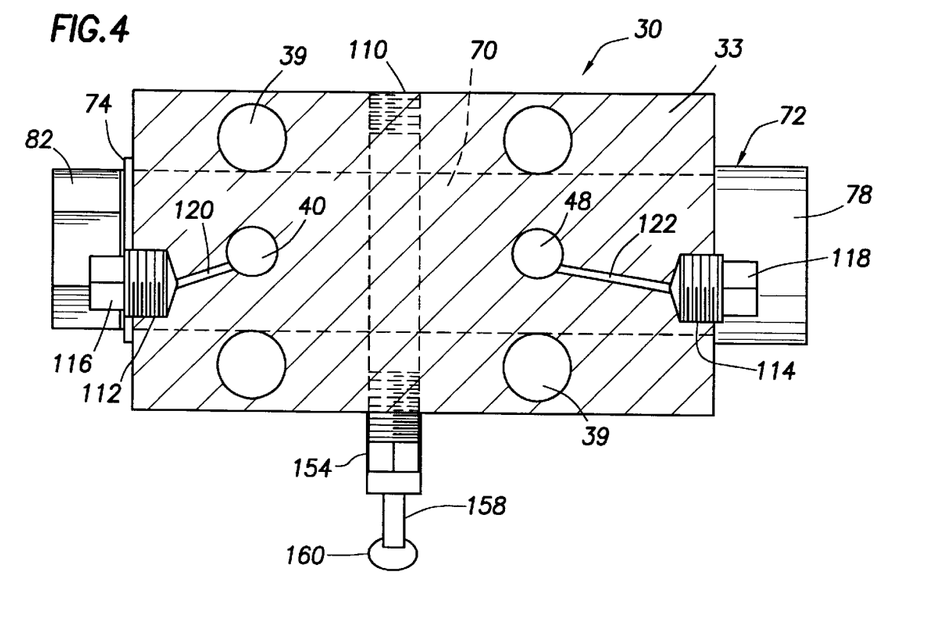
FIG. 4 is a sectional view taken along line 4—4 of FIG. 2.

Referring now to FIGS. 2 and 3 the rotary spool type mode selecting differential pressure instrument support manifold 30 incorporates a manifold body shown generally at 33 which defines a process face surface 34 and an instrument face surface 36. The process face surface and instrument face surface are disposed in oppositely facing, generally parallel relation and are of typically planar configuration. The instrument manifold body 33, as shown in FIGS. 1, 2 and 3, defines a mounting flange 37 having mounting bolt recesses or openings 38 through which mounting bolts extend for mounting the differential pressure sensing transmitter 32 to the instrument face surface 36. As shown in FIG. 4, the manifold body 33 also defines a plurality of internally threaded bolt holes 39 within which bolts are received to secure the process face surface 34 of the manifold body in intimate, face-to-face relation with a process structure 16 or 22 of FIG. 1 as the case may be. It should be borne in mind that within the spirit and scope of the present invention the instrument manifold 30 may be secured to the process structure 16 or 22 by a set of mounting bolts and the differential pressure sensing instrument 32 may be mounted to the manifold body flange 36 by another set of mounting bolts as shown in FIG. 3. If desired, a co-planar adapter 41, shown in FIG. 1, may be interposed in the connection between the manifold mechanism 30 and the transmitter 32 and may be provided with a vent fitting 43 which can be opened to bleed the high pressure and low pressure signal passages of the transmitter to atmosphere when in the "ZERO" mode. Also, if desired, other suitable systems for achieving mounting of the manifold body 33 to the process and for mounting a differential pressure transmitter 32 to the instrument manifold may be employed without departing from the spirit and scope of the present invention.

Figure 5:
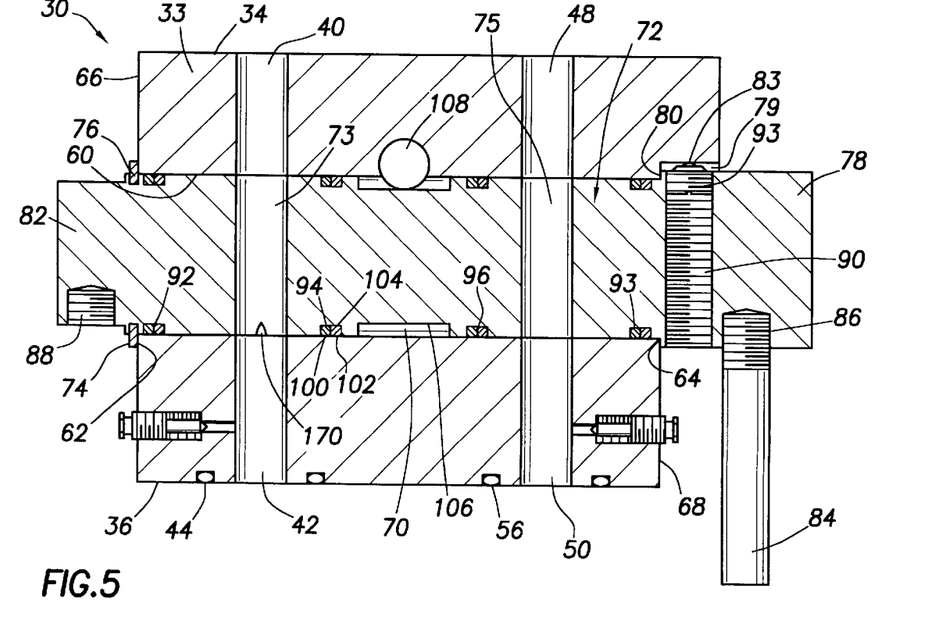
FIG. 5 is a sectional view taken along line 5—5 of FIG. 3.

The manifold body 33 is machined or otherwise formed to define high pressure side inlet and outlet signal passage sections 40 and 42 which are disposed in registry with signal passages of the process structure 42 and the differential pressure transmitter 32 as shown in FIGS. 1 and 5. As shown in FIG. 5, an O-ring type resilient sealing element 44 establishes sealing of the high side signal passage segments 40 and 42 with respect to the process and manifold structures as shown. As shown in FIG. 5, the manifold body 33 also defines low pressure side signal passage sections 48 and 50 which are similarly disposed in registry and which are in communication with the high pressure and low pressure signal passages of the process structures 16 or 22 and the differential pressure transmitter 32 respectively. A resilient O-ring type sealing element 56 is employed to establish sealing of the manifold body 33 with respect to the process structure 16 or 22 and the differential pressure transmitter instrument 32.

Figure 6:
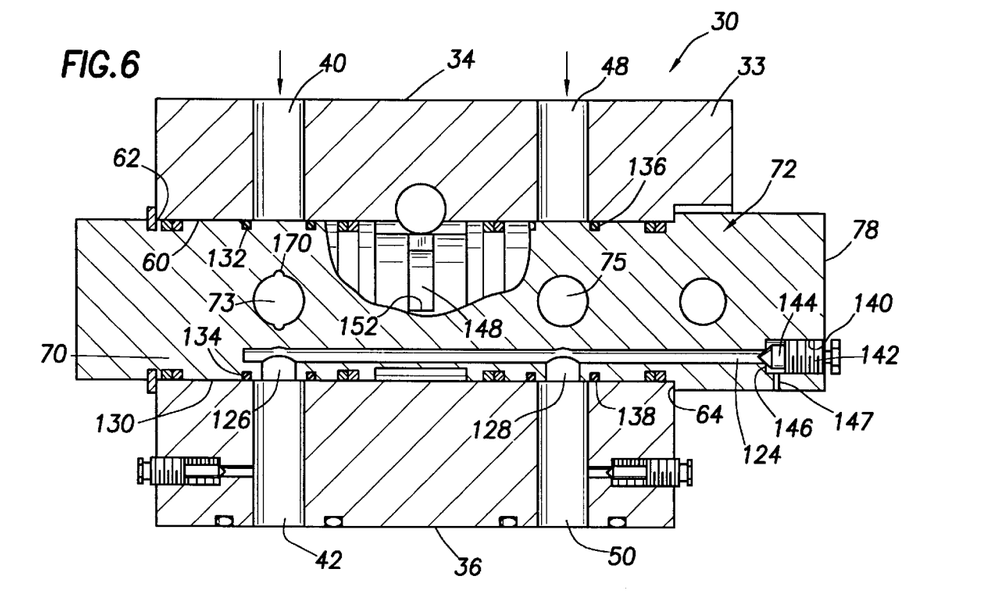
FIG. 6 is a sectional view also taken along line 5—5 of FIG. 3 and showing the rotary valving spool of the manifold assembly being at its ZERO position and with an intermediate portion of the rotary spool element being shown in plan.
Figure 7:
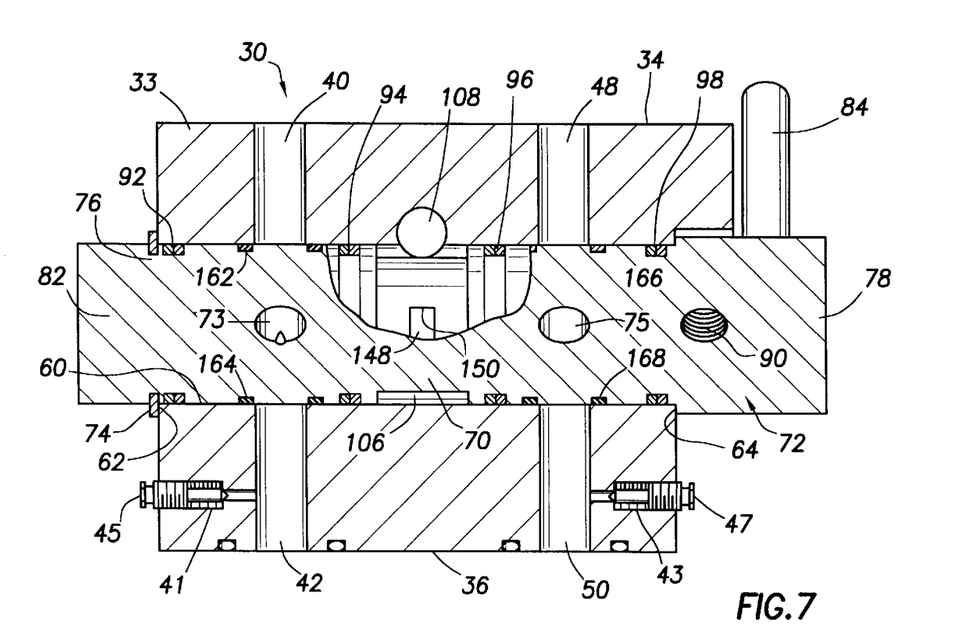
FIG. 7 is a vertical sectional view similar to the view of FIG. 6 and showing the rotary valving spool of the manifold assembly being at its OFF position to permit instrument field calibration in place.

The manifold body 33 is further machined or otherwise formed to define an internal generally cylindrical surface 60, FIGS. 5–7, which is generally in the form of a through bore defining end openings 62 and 64 where the internal generally cylindrical surface 60 intersects end surfaces 66 and 68 of the manifold body 33. The internal cylindrical surface 60 defines a spool chamber 70 within which is disposed a mode selection or valving spool member shown generally at 72. The spool member 72 is maintained properly axially positioned within the spool chamber 70 by a retainer ring 74 which is received within an appropriate retainer groove 76 of the manifold body 33. End portions of the spool member extend through the end openings 62 and 64 of the manifold body 33. An end section 78 of the mode selection spool 72 defines a location shoulder 80 which contacts the end surface 68 of the manifold body 33 to ensure location of the high pressure and low pressure spool signal passages 73 and 75 in alignment with the corresponding signal passages of the manifold body. The rotary mode selection spool member 72 is pressure balanced within the spool chamber 70; thus the spool retainer element 74 and the location shoulder 80 are not subject to any linear spool forces and thus need not be retained against pressure induced displacement from the spool chamber. The retainer element 74 merely ensures that the spool member 72 is properly positioned within the spool chamber 70 so that transverse signal passages 73 and 75 of the spool member 72 are in FIG. 5, the manifold body 33 also defines low pressure side signal passage sections 48 and 50 which are similarly disposed in registry and which are in communication with the high pressure and low pressure signal passages of the process structures 16 or 22 and the differential pressure transmitter 32 respectively. A resilient O-ring type sealing element 56 is employed to establish sealing of the manifold body 33 with respect to the process structure 16 or 22 and the differential pressure transmitter instrument 32.

As shown in FIGS. 5, 6, and 7 the manifold body 33 defines bleed passages 41 and 43 which communicate respectively with signal passage sections 42 and 50. Valve controlled fittings 45 and 47 are connected to the manifold body and permit bleeding of pressure from either or both of the signal passage. For calibration of the transmitter, the high pressure fitting 45 maybe removed and a calibration signal input maybe introduced for calibration.

The manifold body 33 is further machined or otherwise formed to define an internal generally cylindrical surface 60, FIGS. 5–7, which is generally in the form of a through bore defining end openings 62 and 64 where the internal generally cylindrical surface 60 intersects end surfaces 66 and 68 of the manifold body 33. The internal cylindrical surface 60 defines a spool chamber 70 within which is disposed a mode selection or valving spool member shown generally at 72. The spool member 72 is maintained properly axially positioned within the spool chamber 70 by a retainer ring 74 which is received within an appropriate retainer groove 76 of the manifold body 33. End portions of the spool member extend through the end openings 62 and 64 of the manifold body 33. An end section 78 of the mode selection spool 72 defines a location shoulder 80 which contacts the end surface 68 of the manifold body 33 to ensure location of the high pressure and low pressure spool signal passages 73 and 75 in alignment with the corresponding signal passages of the manifold body. The rotary mode selection spool member 72 is pressure balanced within the spool chamber 70; thus the spool retainer element 74 and the location shoulder 80 are not subject to any linear spool forces and thus need not be retained against pressure induced displacement from the spool chamber. The retainer element 74 merely ensures that the spool member 72 is properly positioned within the spool chamber 70 so that transverse signal passages 73 and 75 of the spool member 72 are maintained in position for precise registry with the respective high and low pressure signal passage sections of the manifold body 33. An end 82 of the mode selection spool member may be adapted for driven connection by a rotary actuator device. This is especially beneficial when the transmitter is located remotely, thus permitting controlled actuation of the rotary mode selection spool by signal telemetry from a control facility. The mode selector spool end 82 also defines an internally threaded handle bore 88, thus permitting the actuating handle 84 to be moved to the opposite end of the spool member if desired.

Both the manifold body 33 and the rotary mode selection spool member 72 may be constructed of a wide range of materials. The manifold body may be composed of any suitable metal, such as stainless steel or plated steel or it may be composed of a suitable polymer material having sufficient structural integrity for support of a transmitter. The spool member 72 may likewise be composed of a wide range of metal or polymer materials or composite or plated materials without departing from the spirit and scope of the present invention.

It will become apparent from following discussion that the mode selection spool member 72 can be rotated from is "RUN" position to its "ZERO" position by 90° or less rotation and to its "OFF" position by an approximate additional 22° to 25° of rotation. It is desirable to ensure that rotation of the spool member 72 is restricted so that the sensitive differential pressure transmitter 32 will not be damaged by improper application of signal pressure. As shown in FIGS. 2 and 3, a "RUN" mode position stop pin 81 is fixed to the manifold body 33 and projects to a position where it serves as a positioning stop for the spool actuating handle 84 which is connected to the actuating end 78 of the rotary mode selection spool 72. When the actuating handle 84 comes into contact with the positioning stop pin 81 the spool will be located at its "RUN" position aligning its internal signal passages 73 and 75 with the corresponding signal passage sections of the manifold body. This is also the rodding position of the spool member which permits a cleaning rod to be ran through the signal passages of the manifold body and spool ro remove any deposits that may have accumulated on the passage walls. This "RUN" position of the rotary mode selection spool is also shown in the schematic illustration of FIG. 9. As shown in FIG. 5 the actuating end 78 of the spool member 72 is provided with a spring urged detent 83 which is in line with the spool actuating handle 84 and shows the orientation of the internal signal passages 73 and 75 of the spool. The positioning stop pin 81, when the spool member is at its "RUN" position as shown in FIGS. 2 and 3, will permit only counterclockwise rotation of the spool member to the "ZERO" position indicated by the index slot 85 and the "OFF" position shown by index slot 87. According to FIG. 5, the spool member is provided with an indexing system which will permit operating personnel to "feel" when the rotary mode selecting spool has reached any selected mode. A threaded indexing bore 90 is provided within the spool member and receives a threaded detent support body 93 having a spring urged indexing detent 83 for locating engagement within indexing slots 79, 85 or 87. The indexing detent 83 may be in the form of a spring loaded ball detent which is received within respective indexing slots 79 for the "RUN" position of the rotary mode selection spool, 85 for the "ZERO" position and 87 for the "OFF" position. As the spring urged ball detent reaches an indexing slot it will snap into the slot, thus providing operating personnel with a manual "feel" and perhaps also an audible "click" sound to confirm reaching the index positions.

The spool member 72 is rotated by applying rotary force to the actuator handle 84 to rotate it counter-clockwise from its "RUN" position through its "ZERO" position to its "OFF" position. The spool member 72 can only be returned to its "RUN" position by rotating it clockwise from the "OFF" position through the "ZERO" position to the "RUN" position. This feature satisfies the requirement that a specific mode sequence of spool rotation be used to calibrate the differential pressure transmitter 32 and the exact reversed mode sequence be employed to return the differential pressure transmitter 32 to its "RUN" condition. Return of the rotary mode selection spool 72 to its "RUN" position is normally prevented by a safety feature which will be described in detail hereinbelow in connection with FIGS. 2, 3, 6 and 7 and the schematic illustrations of FIGS. 9, 10 and 11.

The mode selection spool member 72 is rotatable within the spool chamber 70 to its various mode selecting positions as will be discussed hereinbelow and is sealed with respect to the internal cylindrical surface 60 of the spool chamber 70 by a plurality of circumferential seal assemblies 92, 94, 96 and 98 which are located within axially spaced circumferential seal grooves defined in the outer periphery of the spool member 72. The circumferential seal assemblies serve the principal function of isolating the signal passages of the manifold body 33 and mode selection spool 72 from one another and preventing leakage at the open ends 71 and 73 of the spool chamber 70. Each of the circumferential seal assemblies preferably incorporates an O-ring type resilient sealing element 100 and a back-up seal ring 102, as shown in FIG. 5, that are retained within seal grooves 104 that are axially spaced along the axial length of the spool member 72. In each case the resilient O-ring seal will face the process pressure and the back up ring will face away from the process pressure as shown in FIG. 5. The back up seal ring 102 of the seal assembly within the seal groove 104 may be composed of any suitable metal, polymer or elastomer material and may be of any suitable cross-sectional configuration such as square, chevron configuration, C-shaped, etc.

Intermediate its axial length the mode selecting spool member 72 defines a circumferential leakage collection groove 106 which is located between the interior circumferential seal assemblies 94 and 96. The circumferential leakage collection groove 106 is in communication with a vent passage 108 of the manifold body 33 so that any fluid pressure leakage past either of the interior circumferential seal assemblies will be collected by the leakage collection groove 106 and communicated to the vent passage 108 of the manifold body. The vent passage 108 is preferably internally threaded at each of its ends as shown at 110 in FIG. 4 so that a closure plug 111 may be used to close the upper end of the vent passage, depending upon orientation of the manifold, to prevent the collection of rain or debris therein. The lower end of the vent passage will typically remain open to vent leaked gas or other fluid from the leakage collection channel of the rotary spool to the atmosphere. In the alternative a suitable line connector fitting may be utilized to connect a vent line to the manifold body 33 so that leaked fluid from the signal passages to the leakage collection groove may be conducted to any suitable location for disposal. Typically the vent line will be of ¼" internal dimension but may be of any suitable dimension without departing from the spirit and scope of this invention.

As mentioned above, the mode selector spool member 72 defines a pair of transverse high pressure and low pressure spool signal passages 73 and 75 which are located respectively for registry with the high and low pressure side passage segments 40–42 and 48–50 of the manifold body 33. The transverse spool signal passages and the high and low pressure signal passage sections of the manifold body are preferably of ⅜" internal diameter, which internal diameter has gained industry standards acceptance as being the proper signal passage dimension for all elements of the assembly leading to the differential pressure sensors. It is within the spirit and scope of the present invention, however to employ signal passages in the manifold body and mode selection spool member of different dimension in the event industry standards should become changed. In accordance with the present invention the manifold body signal passages 40–42 and 48–50 and also the respective internal transverse passages 73 and 75 of the spool member are in axial alignment to provide the valving and mode selection manifold with a feature known in the industry as "rodability". The term "rodability" feature means that the passages are straight through passages so that a properly sized cleaning rod may be moved through the aligned passages to remove any internal deposits such as deposited scale, hydrate formations or other materials that might tend to build-up within the signal passages and reduce the signal line diameter, thus developing measurement error. It is well known in the industry that typical instrument manifold installations having five-valve function capability do not employ the feature of rodability because certain of the valves thereof are needle valves which will not permit a cleaning rod to be moved therethrough.

In many cases the process fluid flowing through the orifice fitting will be of caustic, acidic or otherwise corrosive nature. If this liquid or gas is conducted into the signal passages of the manifold mechanism 30 or the differential pressure transmitter 32, in time the manifold and transmitter units may become damaged to the point that they require repair or replacement. It is desirable therefore to accomplish purging of the undesirable material from the signal passages from the process by introducing a purging fluid at the manifold. As shown in FIG. 4 internally threaded purge connection receptacles or "taps" 112 and 114 are provided with normally blocking plug members 116 and 118 respectively. Purge passages 120 and 122 extend through the manifold body 33 from the respective purge receptacles 112 and 114 to respective signal passages 40 and 48. Typically the purge passages 120 and 122 will intersect the signal passages of the manifold body 33 upstream of the rotary mode selection spool member 72. Thus, regardless of the rotary position of the spool member 72, purging fluid may be introduced via the purge passages 120 and 122 so that process fluid contained therein will be displaced by the purging fluid back toward the process. When the manifold mechanism is adapted for purging operations the plug members 116 and 118 will be unthreaded from their threaded receptacles and appropriate purge lines will be connected at the receptacles. If the manifold of the present invention is used in connection with bellows or gas flow meters the purge taps 112 and 114 may be used as static pressure taps.

During each calibration sequence of the differential pressure transmitter 32 it is required that the pressures within the high and low pressure signal passages of the transmitter be balanced so that a zero pressure condition will exist across the sensing element of the transmitter. In conventional five-valve function transmitter installations this feature is accomplished by selective manual operation of valves according to a specific valve actuation procedure. According to the present invention, as shown in FIG. 6, a pressure equalizing passage 124 is drilled or otherwise formed in the rotary mode selection spool member 72. Axially spaced transverse equalizing passages 126 and 128 in the rotary spool 72 establish communication with the equalizing passage 124 and also intersect the generally cylindrical outer peripheral surface 130 of the spool member. The transverse equalizing passages 126 and 128 are sufficiently spaced that, at the equalizing or "ZERO" position shown in FIG. 6 they are in communication with the high and low pressure side signal passage segments 42 and 50 of the manifold body. Thus, at the "ZERO" mode position of the rotary spool member 72 the high and low pressure signal passages of the differential pressure transmitter 32 will be balanced.

To ensure that the balanced pressure of the signal passages to the transmitter 32 is confined, circular mode selection seal elements 132, 134, 136 and 138 are retained within circular seal grooves that are defined in the outer peripheral portion of the rotary spool 72. These mode selection seals may be defined by simple elastomer O-rings or by circular sealing elements of any other suitable character. The purpose of these O-rings is to establish sealing between the rotary spool and the internal cylindrical surface 60 of the manifold body 33 at a location immediately surrounding the signal passages of the manifold body.

In the spool position shown in FIG. 6 the mode selector sealing elements 134 and 138 also serve to isolate the equalizing passages 126 and 128 solely to the signal passages 42 an 50 to the transmitter. The opposite side of the spool 72 the mode selection sealing element 132 and 136 serve to isolate the process signal pressure solely to outer peripheral regions of the spool 72 immediately surrounding the process signal passages 40 and 48. Since the equalizing passage 124 must be drilled from a location at the end 78 of the spool 72, as shown in FIG. 6, the equalizing passage must be closed when the manifold is in service. As shown, the outer portion of the equalizing passage is defined by an internally threaded receptacle 140 which receives a plug member 142. This plug member is provided with a hex head to thereby enable it to be threaded into the receptacle 140 or removed therefrom. The plug member 142 also incorporates a tapered valve tip 144 which is seated against a circular internal seat shoulder 146. In the event it should be appropriate to vent the signal passages 42 and 50 to atmosphere, the plug member may be rotated to back the tapered valve tip 144 away from its circular shoulder or seat, thereby permitting fluid pressure to bleed to the atmosphere via a vent passage 147 which is in communication with the receptacle 140. The equalizing passage 124 is rodable or cleanable, a feature which is not available in any transmitter support manifold having five-valve function capability. When the plug member 142 is unthreaded and removed, a cleaning rod or even a pipe cleaner may be run into the equalizing passage to remove deposited material, depending upon the hardness of the deposited material.

To ensure that the rotary spool member is not over-rotated during its rotary movement between the "RUN", "ZERO" and "OFF" positions and to ensure that the rotary spool member is counter-rotated to achieve reverse operational sequence in returning the manifold mechanism to its "RUN" condition as shown in FIGS. 6 and 7, the spool member 72 within the region of the intermediate vent groove 106, defines a spool motion control slot 148 which is of arcuate configuration and defines first and second slot ends 150, FIG. 7, and 152, FIG. 6. As shown in FIGS. 2 and 3, the manifold body 33 is provided with a spool positioning control fitting 154 which is threaded into an internal receptacle or passage of the manifold body as shown in FIG. 4. A spring urged positioning control pin 158, also referred to herein as a safety pin, is movably retained within the positioning control fitting 154 with its inner extremity, at the "RUN" position of the rotary spool, being in contact with the outer peripheral surface of the spool member. When the rotary spool member 72 is rotated toward its "ZERO" position the arcuate spool motion control slot 148 will move into registry with the safety pin. When this occurs the inner end of the safety pin will be moved into the arcuate slot 148 by the force of its spring. With the positioning control safety pin so positioned the rotary spool member 78 can only be rotated within limits defined by the end surfaces 150 and 152 of the arcuate slot 148. This arrangement prevents the rotary spool member from being returned to its "RUN" position until such time as the safety pin is retracted from the arcuate slot. Thus, the rotary spool element will not be inadvertently returned to its "RUN" position; a conscious effort is required which ensures that operating personnel will rotate the spool member back to its "RUN" position only when it is safe to do so. The safety pin 158 is provided with a pull ring 160 which may be pulled to retract the inner end of the pin 158 from the arcuate slot 148. The pull ring 160 is manipulated in this fashion when the pin must be retracted from the arcuate slot 148 to enable return of the spool member to its "RUN" position or to permit linear movement of the spool member for its extraction from the spool chamber 70 of the manifold body.

In the "OFF" position of the rotary spool member 72, illustrated in FIG. 7, opposed mode selecting sealing elements 162 and 164, retained within seal grooves located in the outer peripheral portion of the rotary spool member 72, are oriented in diametrically opposed relation on the spool member and are arranged to encompass the high pressure side signal passages 40 and 42 to provide blocking or sealing of the signal passage sections to both the process and the transmitter 32. Similar opposed mode selecting sealing elements 166 and 168 are retained within seal grooves located in the outer peripheral portion of the rotary spool member 72 and serve to block or seal both of the low pressure signal passage sections 48 and 50. When the rotary spool member 72 is in its "OFF" position or mode, the transmitter is isolated from the process and, after venting of the signal passages 42 and 50 and the corresponding high and low pressure transmitter signal passages, the transmitter 32 may be removed from the manifold body 33 for repair, cleaning or replacement.

When returning the rotary spool member 72 to the "RUN" mode from the "ZERO" mode it is desirable to ensure that the high pressure side of the process is communicated to the differential pressure transmitter before communication of the low pressure side. Even though the transverse signal passages 73 and 75 of the rotary spool member 72 are preferably precisely parallel for aligned registry with the respective high pressure and low pressure inlet and outlet signal passages of the manifold body 33, sequential communication of the high pressure passage before the low pressure signal passage is accomplished by providing a sequencing groove 170 at the region of intersection of the inlet opening of the high pressure signal passage 73 with the substantially cylindrical outer peripheral surface 130 of the rotary spool member 72. The sequencing groove is located so that the high pressure signal passage will establish signal pressure communication before the low pressure signal passage. The sequencing groove is also arranged so that the groove reaches the corresponding signal passage of the manifold body before the cylindrical passage section does. When the spool member is rotated and its transverse signal passages 73 and 75 reach the respective signal passage sections of the manifold body 33, the sequencing grooves 170 and 172 of the high pressure signal passage 73 will come into fluid communication with the respective high pressure signal passage sections before the low pressure signal passage 75 begins its fluid communication with the corresponding low pressure signal passage sections 48 and 50 of the manifold body. Thus, any uncontrolled pressure waves in the process will always reach the high pressure side of the signal passage system of the manifold and the transmitter first and thus "zero shift" due to the potential over-range pressure of such uncontrolled pressure waves in the process will be eliminated or minimized. When the present invention is employed it is not necessary for operating personnel to conduct special sequencing of valves to ensure pressurization of the high side signal passages before pressurization of the low side signal passages. The present invention provides this safety protection automatically during each rotary spool actuation without requiring specific operator attention.

Referring now to FIG. 8, depending upon the condition of line size, pressure and flow rate through an orifice plate type primary element, the orifice plate may have a thickness of ⅛" or ¼". At line size, process pressure and flow rate above a predetermined maximum, an orifice plate of ⅛" will tend to become bowed by the pressure induced force acting on it. When this condition occurs, the differential pressure measurement signal will be in error due to the bowed condition of the orifice plate. Above a predetermined line size, process pressure and flow rate a primary element will be provided with an orifice plate having a thickness of ¼" to eliminate or minimize potential measurement error. In many cases, companies have standardized on the use of ¼" thick orifice plates to minimize the difficulty and expense of maintaining two orifice plate thicknesses for all line sizes. When a ¼" thick orifice plate is employed, the center-line spacing between the orifice flange union signal taps on each side of the orifice plate will be greater than when an orifice plate of ⅛" thickness is employed. The increased pressure tap spacing causes the spacing of the high and low pressure orifice flange union signal taps of the process to be greater by ⅛". To accommodate this wider spacing, an alternative embodiment of the present invention is presented in FIG. 8 having a manifold body 174 that defines inclined or diverging high pressure and low pressure signal inlet are passage sections 176 and 178 having greater spacing at the process face surface 180 than at the internal cylindrical surface 182 of the rotary spool chamber. At the intersection of the inclined or diverging high pressure and low pressure signal inlet passage sections 176 and 178 with the cylindrical internal surface of the mode selection spool chamber 184 the spacing of the inlet passage openings 186 and 188 is the same as the embodiment shown in FIGS. 4–7, i.e., the same as when the primary element incorporates an orifice plate having a thickness of ⅛". On the instrument side of the manifold body 174 the high and low pressure process signal passage sections 190 and 192 are oriented in parallel relation and have passage spacing that is the same as shown in FIGS. 4–7. Thus the manifold body 174 will fit a conventional transmitter and will accommodate wider spaced signal tap inlets from the process and will maintain the design requirement of providing uninterrupted ⅜" signal passages from the process, through the mode selection manifold, to the signal passages of the transmitter. The ¹⁄₁₆" offset will have no measurable influence on the accuracy of measurement. It should be born in mind, however, that rodability or cleaning of deposits will require a flexible cleaning rod, such as a flexible cleaning spring, because the signal passage sections of the manifold body will not be in aligned registry. The cost savings of the embodiment shown in FIG. 8 will be significant, because only the high and low pressure signal inlet passage sections will be changed. All other components of the manifold mechanism will be interchangeable between these embodiments and the manifold of FIG. 8 will properly fit the other connection components of standard instruments.

Figure 9:
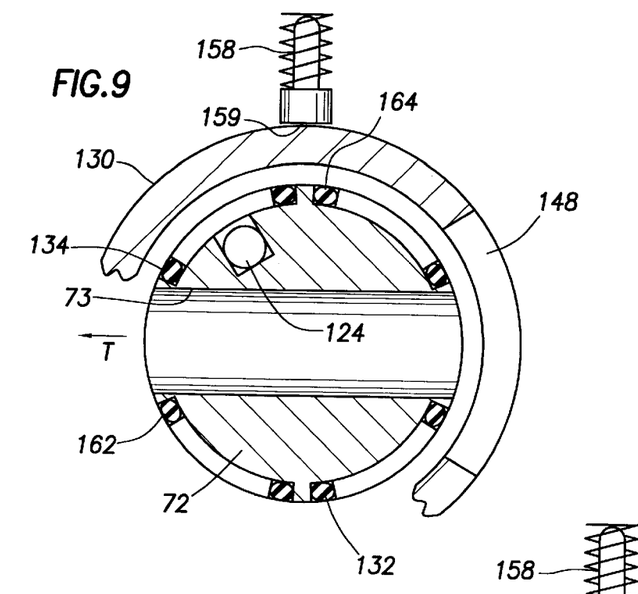
FIG. 9 is a schematic illustration of the "run" position of the rotary mode selection spool member relative to the manifold body.
Figure 10:
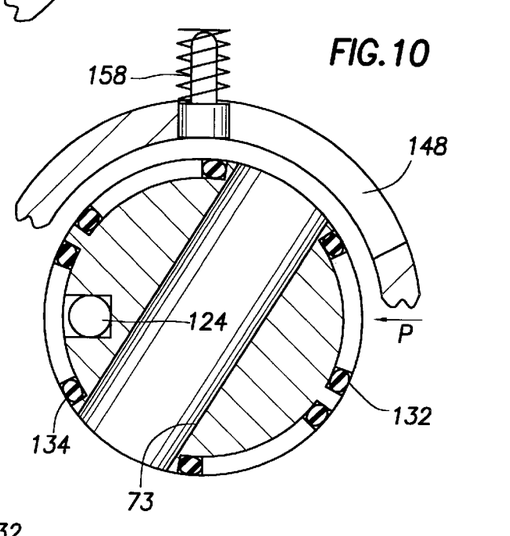
FIG. 10 is a schematic illustration of the "zero" position of the rotary mode selection spool member relative to the manifold body.
Figure 11:
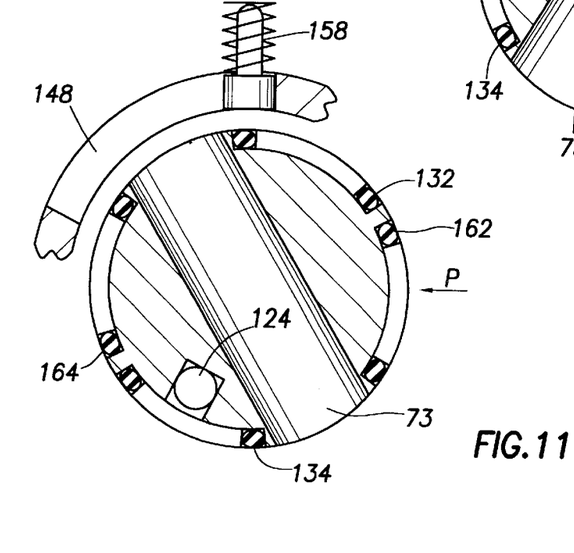
FIG. 11 is a schematic illustration of the "off/calibrate" position of the rotary mode selection spool member relative to the manifold body.

FIGS. 9, 10 and 11 are schematic illustrations showing the three selected positional modes of the manifold mechanism of the present invention, i.e., "RUN", "ZERO" and "OFF", respectively. It should be understood that these Figs. show the safety slot 148 as being located radially beyond the outer periphery of the spool member 72. This feature is presented schematically to enhance the understanding of the reader. In actuality, as shown in FIGS. 6 and 7, the arcuate safety slot 143 is provided in the rotary mode selecting spool member and the safety pin 158 is supported in movable relation with the manifold body 33 by the pin support fitting 154. FIGS. 9, 10 and 11 also show the positions of the mode selection seals of the rotary spool member 72 relative to the internal cylindrical surface 60 of the manifold body 33 and the condition of the spring urged safety pin 158 relative to the arcuate slot 148 of the rotary mode selection spool member 72. It should, however, be understood that the three positional modes of the rotary mode selecting spool member are subject to design. The particular rotary positions of the spool member may be changed as dictated by design, but the function of positional modes will not change.

At the "RUN" mode condition of the mode selection manifold mechanism the spring urged safety pin 158 will be positioned with its inner end 159 in engagement with the cylindrical outer peripheral surface 130 of the mode selection spool 72 as shown schematically in FIG. 9. Thus, when a rotating force is applied to the operating handle 84 of the rotary mode selection spool 72, the spool will be rotated counter-clockwise as shown in FIG. 3. At the "RUN" position, as mentioned above, the stop pin 81 will prevent clockwise rotation of the spool member. As this counter-clockwise spool rotation occurs, the internal rotation control slot 148 of the spool member, shown in FIGS. 6 and 7 will be rotated toward the safety pin 158. When the internal arcuate rotation control slot 148 of the spool member is rotated by the mode selection spool into registry with the safety pin 158 the spring of the safety pin will move the safety pin so that the inner end 159 of the safety pin is received within the arcuate rotation control slot 148. When this condition occurs the mode selection spool member can be rotated between the "ZERO" position of FIG. 10 and the "OFF" position of FIG. 11, but it cannot be counter-rotated to the "RUN" position without first retracting the safety pin from the rotation control slot. Any attempt to rotate the mode selection spool further than the "OFF" position or back to the "RUN" position, without first retracting the safety pin from the arcuate slot, will be prevented by the slot end shoulders 148 and 150 shown in FIGS. 7 and 6 respectively. Thus, if the transmitter has been removed from the mode selection manifold 30, a user is not likely to rotate the spool actuating handle to the "RUN" mode and cause release of pressurized process fluid.

When the mode selection spool 72 is in its "ZERO" position, the inlet pressure signals from the process will be blocked by the circular sealing elements 132 and 136 as shown in FIGS. 6 and 10 and the pressure equalizing passage 124 will be in communication with the high pressure and low pressure signal passage sections to the transmitter. The transmitter can be removed from the manifold in this "ZERO" spool mode or position by first bleeding the transmitter passages to atmosphere. Venting of the transmitter signal passages can be accomplished by unseating the tapered tip 144 from its circular seat shoulder 146, FIG. 6, so that venting takes place through the vent passage 147. Alternatively, the vent control fitting 43 of the co-planar adapter 41 may be opened to bleed down pressure from the instrument passages downstream of the rotary mode selection spool 72. The transmitter may also be removed from its manifold mount when the mode selector spool is in the "OFF" position after having first opened the vent valve 43 of the co-planar adapter 41 shown in FIG. 1.

At the "OFF" position of the rotary mode selection spool 72, shown in FIGS. 7 and 11, the mode selecting O-ring sealing elements 162 and 164 will block both the signal inlet and signal outlet passages of the manifold body at the rotary spool member. The equalizing passage 124 will be out of communication with the high and low pressure signal outlet passage sections. When this is done, the transmitter instrument may be calibrated. The safety feature of the manifold assembly of the present invention prevents rotation of the rotary mode selecting spool back to the "RUN" position and thus maintains the signal inlet ports blocked during calibration, thus ensuring that the sensitive calibration equipment is not inadvertently subjected to process pressure.

When the manifold assembly is in the "ZERO" or "OFF" modes and clockwise rotational force is applied to the actuating handle 84, the presence of the safety pin 158 within the arcuate slot 148 of FIGS. 6 and 7 will limit clockwise rotation so that only the "ZERO" mode can be reached. At this position the stop shoulder 152 of the arcuate slot 148 will contact the safety pin and will prevent further clockwise rotation of the spool member. At the "ZERO" or "OFF" modes of the rotatable mode selecting spool member 72 the high and low pressure signal inlets will be blocked by the mode selecting seals of the rotary spool member, so process pressure is blocked and cannot be communicated to the transmitter signal passages. To rotate the spool member clockwise to the "RUN" position the operator must grasp the pull ring 160 of the safety pin 158 and apply sufficient force to overcome the spring of the safety pin. When the safety pin has been pulled free of the arcuate slot 148 the spool member can be rotated clockwise to the "RUN" position.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A method for accomplishing multi-valve function mode selection between a pressurized process having high and low differential pressure signals and a differential pressure transmitter having high and low pressure signal passages, comprising:
    (a) providing a rotary spool manifold connected to the pressurized process and the differential pressure transmitter having a manifold body defining a pair of signal passages in communication with said differential pressure signals of said pressurized process and a spool element being rotatable within said manifold body and having transverse signal passages therethrough and being located for registry with said pair of signal passages of said manifold body, said spool element having an equalizing passage disposed for selective communication with said pair of signal passages and being sealed with respect to said instrument body by a plurality of circumferential seal means located for isolating pressure signals of said pair of signal passages from one another, said spool element having a mode seal means establishing sealing with the outer periphery of said spool element and establishing sealing with said manifold body;
    (b) rotatably positioning said spool element at a "RUN" mode where said transverse signal passages of said spool element are in aligned registry with said aligned signal passages of said manifold body and enabling differential pressure of the pressurized process to be transmitted to the respective passages of the differential pressure transmitter through said signal passages of said manifold body and said spool element;
    (c) rotating said spool element from said "run" position to a "ZERO" mode where said transverse signal passages of said spool element are out of pressure transmitting registry with said pair of signal passages of said manifold body and said mode seal means blocks signal pressure from the pressurized process and said equalizing passage is positioned in communication with said aligned signal passages to the differential pressure transmitter for equalizing pressure in both signal passages of the differential pressure transmitter; and
    (c) rotating said spool element from said "ZERO" mode to said "RUN" mode.

2. The method of claim 1, comprising:
    (a) initially latching said spool element at said "ZERO" mode to prevent rotation of said spool element from said "ZERO" mode to said "RUN" mode; and
    (b) selectively unlatching said spool element to permit rotation of said spool element from said "ZERO" mode to said "RUN" mode.

3. The method of claim 1, comprising:
    (a) rotating said spool element from said "ZERO" position to an "OFF" position where said equalizing passage is out of communication with said aligned signal passages to the differential pressure transmitter, where said transverse signal passages of said spool element are out of pressure transmitting registry with said pair of signal passages of said manifold body and where said mode seal means blocks signal pressure from the pressurized process; and
    (b) counter-rotating said spool element from said "OFF" mode through said "OFF" mode and back to said "RUN" mode.

4. The method of claim 1, comprising:
    (a) rotating said spool element through a range of about 90° between said "RUN" mode and said "ZERO" mode; and
    (b) rotating said spool element through an additional range of about 22° to 25° from said "ZERO" mode to said "OFF" mode.

5. The method of claim 1, comprising:
    during said counter-rotating said spool element from said "OFF" mode through said "OFF" mode and back to said "RUN" mode, communicating the high pressure signal of the pressurized process to the high pressure signal passage of said differential pressure transmitter before communicating the low pressure signal of the pressurized process to the low pressure signal passage of the differential pressure transmitter.

6. The method of claim 1, comprising:
    with said spool element located at said "RUN" position, conducting double block and bleed activity with said differential pressure transmitter.

7. A spool type differential pressure transmitter support and mode selecting manifold, comprising:
    (a) a manifold body defining a process face and a transmitter face and defining a spool chamber and having high and low pressure signal passages of a predetermined internal dimension intersecting said process and transmitter faces and being in communication with said spool chamber, (b) a mode selecting spool member being positioned for rotation within said spool chamber and defining high and low pressure signal passages of said predetermined internal dimension disposed for selective registry with said high and low pressure signal passages of said manifold body at a selected rotational position of said mode selecting spool member relative to said manifold body; and (c) resilient mode selecting seal means establishing sealing with said mode selecting spool member and with said manifold body within said mode selecting spool chamber and controlling communication of said high and low pressure signal passages of said manifold body with said transversely oriented spool passages of said mode selecting spool member responsive to rotational positioning of said mode selecting spool member relative to said manifold body.

8. The spool type differential pressure transmitter support and mode selecting manifold of claim 7, wherein:

(a) said manifold body defining a generally cylindrical internal surface defining at least a part of said mode selecting spool chamber; and (b) said resilient mode selecting seal means being a plurality of seal members supported at rotationally and axially spaced locations on the outer periphery of said mode selecting spool member and having sealing engagement with said generally cylindrical internal surface.

9. The spool type differential pressure transmitter support and mode selecting manifold of claim 8, wherein:

(a) said mode selecting spool member being rotatable within said mode selecting spool chamber to a "RUN" mode position where said transversely oriented spool passages of said mode selecting spool member are in aligned registry with said high and low pressure signal passages of said manifold body and said resilient mode selecting seal members are disposed in rotationally spaced relation with said high and low pressure signal passages of said manifold body;

(b) said mode selecting spool member having an internal equalizing passage having ends disposed for equalizing communication with said high and low pressure signal outlet passages of said manifold body, said mode selecting spool member being rotatable within said mode selecting spool chamber to a "ZERO" mode position where said transversely oriented spool passages of said mode selecting spool member are out of aligned registry with said high and low pressure signal inlet and outlet passages of said manifold body and said resilient mode selecting seal members are disposed in blocking relation with said high and low pressure signal inlet passages of said manifold body and said equalizing passage is in communication with said high and low pressure signal outlet passages of said manifold body; and (c) said mode selecting spool member being rotatable within said mode selecting spool chamber to an "OFF" mode position where said transversely oriented spool passages of said mode selecting spool member are out of aligned registry with said high and low pressure signal inlet and outlet passages of said manifold body and said resilient mode selecting seal members are disposed in blocking relation with said high and low pressure signal inlet and outlet passages of said manifold body.

10. The spool type differential pressure transmitter support and mode selecting manifold of claim 9, wherein:

at said "RUN" position of said rotary mode selecting spool member said high and low pressure signal passages of said rotary mode selecting spool member being disposed in aligned registry with said high and low pressure signal inlet and outlet passages of said manifold body thus rendering said manifold "rodable" and enabling removal of internal deposits therefrom by a rigid or flexible cleaning rod.

11. The spool type differential pressure transmitter support and mode selecting manifold of claim 10, wherein:

said manifold body and said rotary mode selecting spool member having indexing means for indicating location of said rotary mode selecting spool member at said "RUN", "ZERO" and "OFF" positions thereof.

12. The spool type differential pressure transmitter support and mode selecting manifold of claim 7, wherein:

said mode selecting seal means being a plurality of O-ring sealing elements each being received within circular seal grooves defined in the outer periphery of said rotatable mode selecting spool member and establishing sealing with said rotatable mode selecting spool member and said manifold body, said plurality of O-ring sealing elements each being of a dimension for encompassing and blocking said high and low pressure signal inlet and outlet passages of said manifold body.

13. The spool type differential pressure transmitter support and mode selecting manifold of claim 7, wherein:

said high and low pressure signal inlet and outlet passages of said manifold body and said signal passages of said rotatable mode selecting spool member being of the same diameter and adapted for positioning in aligned uninterrupted registry to permit removal of deposits from said high and low pressure signal inlet and outlet passages by a cleaning rod.

14. The spool type differential pressure transmitter support and mode selecting manifold of claim 13, wherein:

said high and low pressure signal inlet and outlet passages of said manifold body and said signal passages of said rotatable mode selecting spool member each being of circular cross-sectional configuration and having an internal diameter of $3/8$".

15. The spool type differential pressure transmitter support and mode selecting manifold of claim 7, wherein:

said spool element defining an internal equalizing passage having openings at spaced locations on the periphery of said rotary mode selecting spool member and being disposed for registry with said high and low pressure signal outlet passages.

16. The spool type differential pressure transmitter support and mode selecting manifold of claim 7, wherein:

said equalizing passage being of substantially straight configuration and being accessible by a rigid or flexible cleaning element for cleaning of process fluid deposits therefrom.

17. The spool type differential pressure transmitter support and mode selecting manifold of claim 7, wherein:

(a) said rotatable mode selecting spool member being rotationally positionable relative to said manifold body at a "RUN" position where said transversely oriented body passages are in registry with said signal inlet and outlet passages, an "OFF" position where said transversely oriented body passages are out of registry with said signal inlet and outlet passages and isolated by said resilient seal means from said signal inlet and outlet passages and a "ZERO" position where said transversely oriented body passages are isolated by said resilient seal means from said signal inlet and outlet passages and the fluid pressure of said inlet and outlet passages is equalized;

(b) a pair of annular resilient circumferential sealing elements being located about said spool member between said transverse high and low pressure signal passages and being disposed in axially spaced relation, said pair of annular resilient circumferential sealing elements establishing sealing with said rotatable mode selecting spool member and with said generally cylindrical internal surface and defining an annular vent region between said spool and said generally cylindrical internal surface; and (c) said manifold body defining a vent passage in communication with said vent region for venting from said annular vent region any leakage of process fluid from said high or low pressure signal passages past said pair of annular resilient circumferential sealing elements.

18. The spool type differential pressure transmitter support and mode selecting manifold of claim 7, wherein:
said rotatable mode selecting spool element being rotatable to "RUN", "ZERO" and "OFF" positions within said spool chamber of said manifold and enabling double-block-and-bleed mode selecting function.

19. The spool type differential pressure transmitter support and mode selecting manifold of claim 7, wherein:
(a) said manifold body defining a pair of purge passages having respective communication with said high and low pressure signal passages of said manifold body; and
(b) said manifold body having purge connections for connection of purge conduits to each of said purge passages through which purge fluid is injected into said purge passages for displacing undesirable process fluid from said manifold back to the process piping.

20. The spool type differential pressure transmitter support and mode selecting manifold of claim 19, wherein:
static pressure measurement connections being in communication with said purge passages and permitting connection of static pressure measurement apparatus in communication with said pressure signal passages of said manifold when the static pressure measurement apparatus is located remote from said manifold.

21. The spool type differential pressure transmitter support and mode selecting manifold of claim 7, wherein:
(a) said spool member being exposed at each and defining a handle connection; and
(b) a handle member for actuation of said spool member, said handle member being adapted for location at a selected handle connection.

22. The spool type differential pressure transmitter support and mode selecting manifold of claim 7, wherein:
said manifold body and said mode selecting spool member having releasable locking means preventing rotation of said mode selecting spool member from said "ZERO" mode to said "RUN" mode and being movable to a release position permitting rotation of said mode selecting spool member from said "ZERO" mode to said "RUN" mode.

23. The spool type differential pressure transmitter support and mode selecting manifold of claim 22, wherein:
(a) said spool member defining a safety slot; and
(b) said releasable locking means being a spring urged safety pin defining a locking end and being movably supported by said manifold body, said locking end of said safety pin engaging said spool member at said "RUN" mode and being moved into said safety slot upon rotation of said spool member to said "ZERO" mode, said spring urged safety pin preventing rotation of said spool member from said "ZERO" mode to said "RUN" mode until said locking end of said safety pin has been retracted from said safety slot.

24. The spool type differential pressure transmitter support and mode selecting manifold of claim 7, wherein:
a slot being defined at the intersection of said high pressure signal passage of said spool member with the outer periphery of said spool member to permit communication of process pressure to said high pressure signal passage of said spool member before communication of process pressure to said low pressure signal passage of said spool member when said spool member is rotated to said "RUN" mode.

25. A spool type differential pressure transmitter support and mode selecting manifold, comprising:
(a) a manifold body defining a process face and a transmitter face and defining a spool chamber and having high and low pressure signal passages of a predetermined internal dimension intersecting said process and transmitter faces and being in communication with said spool chamber;
(b) a mode selecting spool member being positioned for rotation within said spool chamber and defining high and low pressure signal passages of said predetermined internal dimension disposed for selective registry with said high and low pressure signal passages of said manifold body at a selected rotational position of said mode selecting spool member relative to said manifold body, said mode selecting spool member defining an internal equalizing passage having openings disposed for communication with said high and low pressure signal passages to the transmitter; and
(c) resilient mode selecting seal means establishing sealing with said mode selecting spool member and with said manifold body within said mode selecting spool chamber and controlling communication of said high and low pressure signal passages of said manifold body with said transversely oriented spool passages of said mode selecting spool member responsive to rotational positioning of said mode selecting spool member relative to said manifold body.

26. The spool type differential pressure transmitter support and mode selecting manifold of claim 25, wherein:
(a) said equalizing passage being of substantially straight configuration and having an opening at one end of said spool member,
(b) a closure member normally closing said equalizing passage opening and being removable to permit access into said equalizing passage by a cleaning element to permit removal of any process material deposited therein.

* * * * *